United States Patent
Ishii et al.

(10) Patent No.: US 11,167,767 B2
(45) Date of Patent: Nov. 9, 2021

(54) MOVING OBJECT TRAVEL SUPPORT APPARATUS AND METHOD

(71) Applicant: HITACHI AUTOMOTIVE SYSTEMS, LTD., Ibaraki (JP)

(72) Inventors: Takaya Ishii, Tokyo (JP); Masahito Mitsuhashi, Tokyo (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 194 days.

(21) Appl. No.: 16/480,384

(22) PCT Filed: Feb. 21, 2018

(86) PCT No.: PCT/JP2018/006149
§ 371 (c)(1),
(2) Date: Jul. 24, 2019

(87) PCT Pub. No.: WO2018/159399
PCT Pub. Date: Sep. 7, 2018

(65) Prior Publication Data
US 2019/0344801 A1    Nov. 14, 2019

(30) Foreign Application Priority Data
Mar. 3, 2017 (JP) .............................. JP2017-041099

(51) Int. Cl.
*B60W 50/08* (2020.01)
*B60W 30/18* (2012.01)
(Continued)

(52) U.S. Cl.
CPC ............ *B60W 50/08* (2013.01); *B60W 30/18* (2013.01); *G05D 1/0061* (2013.01);
(Continued)

(58) Field of Classification Search
CPC . G05D 1/0061; G05D 1/0066; B60W 50/082; B60W 2050/0095; B60W 60/005
See application file for complete search history.

(56) References Cited

U.S. PATENT DOCUMENTS

2014/0303827 A1  10/2014  Dolgov et al.
2015/0309510 A1  10/2015  Cudak et al.
(Continued)

FOREIGN PATENT DOCUMENTS

FR    3038280 A1    1/2017
JP    2002-251690 A  9/2002
(Continued)

OTHER PUBLICATIONS

International Search Report dated May 15, 2018 for the PCT International Application No. PCT/JP2018/006149.
(Continued)

*Primary Examiner* — Kenneth J Malkowski
(74) *Attorney, Agent, or Firm* — Volpe Koenig

(57) ABSTRACT

An object is to reduce a current detection error of a current sensor while suppressing upsizing of a power conversion device equipped with the current sensor. A power conversion device includes a power conversion circuit; a conductor to transmit current to the circuit; and a coreless current sensor to detect the current. The coreless current sensor includes: a magnetic field detection portion; and a shield portion facing the magnetic field detection portion. The conductor includes: a first conductor portion that passes through a space between the magnetic field detection portion and shield portion; and a second conductor portion connected to the first conductor portion via a first bent portion, and the first bent portion is formed such that the space between the magnetic field detection portion and shield portion is not (Continued)

disposed in a direction perpendicular to a face of the second conductor portion closest to the shield portion.

13 Claims, 11 Drawing Sheets

(51) Int. Cl.
  *G05D 1/00* (2006.01)
  *G06K 9/00* (2006.01)
  *G08G 1/01* (2006.01)
  *B60W 50/00* (2006.01)

(52) U.S. Cl.
  CPC ....... *G05D 1/0088* (2013.01); *G06K 9/00818* (2013.01); *G06K 9/00825* (2013.01); *G08G 1/0125* (2013.01); *B60W 2050/0072* (2013.01); *B60W 2520/10* (2013.01); *B60W 2556/00* (2020.02); *G05D 2201/0213* (2013.01)

(56) References Cited

U.S. PATENT DOCUMENTS

| | | |
|---|---|---|
| 2016/0033964 A1 | 2/2016 | Sato et al. |
| 2016/0259334 A1* | 9/2016 | Hashimoto .......... G05D 1/0061 |
| 2017/0197635 A1* | 7/2017 | Sato ................. B60W 30/10 |
| 2018/0043825 A1 | 2/2018 | Nakashima |
| 2018/0173225 A1* | 6/2018 | Kim ................. B60W 30/0956 |

FOREIGN PATENT DOCUMENTS

| | | |
|---|---|---|
| JP | 2011-131838 A | 7/2011 |
| JP | 2016-034782 A | 3/2016 |
| JP | 2016-049933 A | 4/2016 |
| JP | 2016-091412 A | 5/2016 |
| JP | 2016-162229 A | 9/2016 |
| JP | 2017-213940 A | 12/2017 |
| JP | 2018-025986 A | 2/2018 |
| WO | 2016/035485 A1 | 3/2016 |

OTHER PUBLICATIONS

Walch et al., Autonomous Driving: Investigating the Feasibility of Car-Driver Handover Assistance, Proceedings of the 7th International Conference on Automotive User Interfaces and Interactive Vehicular Applications, pp. 11-18, Sep. 3, 2015.
Extended European Search Report dated Dec. 8, 2020 for European Patent Application No. 18761993.7.

* cited by examiner

FIG. 4

| | VISIBILITY INFORMATION DETERMINATION TABLE T1 | |
|---|---|---|
| ID (C11) | ROAD INFORMATION (VISUAL RECOGNITION TARGET) (C12) | WEIGHT (C13) |
| 1 | TRAFFIC SIGNAL | 10 |
| 2 | OTHER VEHICLE (PROBABILITY OF CONTACT: HIGH) | 8 |
| 3 | OTHER VEHICLE (PROBABILITY OF CONTACT: LOW) | 3 |
| 4 | TRAVELING ROUTE | 4 |
| 5 | ROAD SIGN (IMPORTANCE: HIGH) | 8 |
| 6 | ROAD SIGN (IMPORTANCE: LOW) | 2 |
| ... | ... | ... |

FIG. 5

| | TRAVEL CONTROL DETAILS DECISION TABLE T2 | |
|---|---|---|
| ID (C21) | ROAD INFORMATION (VISUAL RECOGNITION TARGET) (C22) | DETAILS (C23) |
| 1 | TRAFFIC SIGNAL | INCREASE INTER-VEHICLE DISTANCE |
| 2 | OTHER VEHICLE (PROBABILITY OF CONTACT: HIGH) | DECELERATE GREATLY AND LET IT PASS |
| 3 | OTHER VEHICLE (PROBABILITY OF CONTACT: LOW) | DECELERATE |
| 4 | TRAVELING ROUTE | DECELERATE |
| 5 | ROAD SIGN (IMPORTANCE: HIGH) | LATERALLY SHIFT POSITION OF SUBJECT VEHICLE |
| 6 | ROAD SIGN (IMPORTANCE: LOW) | — |
| ... | ... | ... |

US 11,167,767 B2

MOVING OBJECT TRAVEL SUPPORT APPARATUS AND METHOD

TECHNICAL FIELD

The present invention relates to a moving object travel support apparatus and method.

BACKGROUND ART

In recent years, as known as an automatically driven vehicle, a travel support apparatus that supports driving of a driver has been developed. For example, there is a known technology in which driver's predetermined switch operation during traveling starts automatic travel of a vehicle at a vehicle speed at the time of switch operation set as a cruise setting speed. However, with such a travel support apparatus, there is a possibility of switching to automatic travel in a state where grip for manual travel is weakened in a case where the mode is to be returned from the automatic travel to the manual travel.

Accordingly, a technology described in PTL 1 calculates a safe travel region for a subject vehicle, and completely cancels the automatic travel mode and switches the mode to the manual travel mode in a case where the driver has traveled the safe travel region for a predetermined time or more.

CITATION LIST

Patent Literature

PTL 1: JP 2011-131838 A

SUMMARY OF INVENTION

Technical Problem

However, the conventional travel support apparatus has given little consideration as to whether the driver has ability to recognize the road condition after the mode is switched to the manual travel mode. Therefore, the conventional technology has a possibility that in a case where an obstacle is present around the vehicle, the driver might take over the driving with no prediction of a risk concerning a manual travel zone.

The present invention is made in view of the above problems and aims to provide a moving object travel support apparatus and a method capable of supporting appropriate switching from the automatic travel mode to the manual travel mode.

Solution to Problem

In order to solve the above problem, a moving object travel support apparatus according to the present invention is a moving object travel support apparatus capable of switching between a manual travel mode and an automatic travel mode, and includes: a travel mode determination unit that determines which travel mode is to be selected out of a manual travel mode and an automatic travel mode; a scheduled switching point decision unit that decides a scheduled switching point at which the automatic travel mode is switched to the manual travel mode in a case where the travel mode determination unit selects the manual travel mode; and a travel control details decision unit that decides travel control details at the time of travel in the automatic travel mode up to the scheduled switching point on the basis of a condition of a predetermined manual travel zone including the scheduled switching point out of the manual travel zones on which travel in the selected manual travel mode is scheduled.

Advantageous Effects of Invention

According to the present invention, it is possible to decide the travel control details at the time of travel in the automatic travel mode up to the scheduled switching point on the basis of the condition of the predetermined manual travel zone including the scheduled switching point, making it possible to support appropriate switching from the automatic travel mode to the manual travel mode.

BRIEF DESCRIPTION OF DRAWINGS

FIG. 4 is a configuration diagram of a visibility information determination table for weighted management of objects visually recognized by a driver.

FIG. 5 is a configuration diagram of a travel control details decision table for deciding travel control details in accordance with weights of visual recognition targets.

DESCRIPTION OF EMBODIMENTS

Hereinafter, embodiments of the present invention will be described with reference to the drawings. In the present embodiment, a travel support apparatus 1 for an automobile will be described as an example of a moving object travel support apparatus. In addition, the present invention can support travel of a moving object other than an automobile.

As will be described in detail below, the travel support apparatus 1 according to the present embodiment decides automatic travel details (travel control details) up to the scheduled switching point on the basis of a surrounding environment of each of the scheduled switching point and the manual travel zone at the time of switching from the automatic travel mode to the manual travel mode. A travel control details decision unit 124 configured to decide travel control details decides the travel control details for achieving smooth manual travel on the basis of the driver's visual recognition condition for the surrounding environment of each of the scheduled switching point and the manual travel zone.

The travel support apparatus 1 according to the present embodiment is capable of controlling the vehicle so that the driver can visually recognize the surrounding environment. Accordingly, it is possible to switch the drive mode from the automatic travel mode to the manual travel mode in a state where the driver can predict a risk concerning the manual travel zone. This makes it possible to create a condition enabling the driver to easily take over driving in switching from the automatic travel mode to the manual travel mode.

Note that the term "automatic travel mode" as used herein includes not only a fully automatic travel mode enabling automatic travel of a vehicle to the destination after input of the destination, but also a mode of supporting manual driving. Examples of the mode of supporting manual driving include travel modes having received driving support by a system (Lane Keeping Assist (LKA)) that uses a lane keeping assistance function and reduces the driver's burden during in-lane travel or by a system that performs throttle control/brake control (Adaptive Cruise Control (ACC)) on the basis of inter-vehicle distance with a preceding vehicle and that controls the speed and the inter-vehicle distance.

The travel support apparatus 1 according to the present embodiment can also provide information related to travel mode switching to the driver at the time of switching from the automatic travel mode to the manual travel mode. This makes it possible to facilitate take-over from the automatic travel mode to the manual travel mode.

First Exemplary Embodiment

Figure 1:
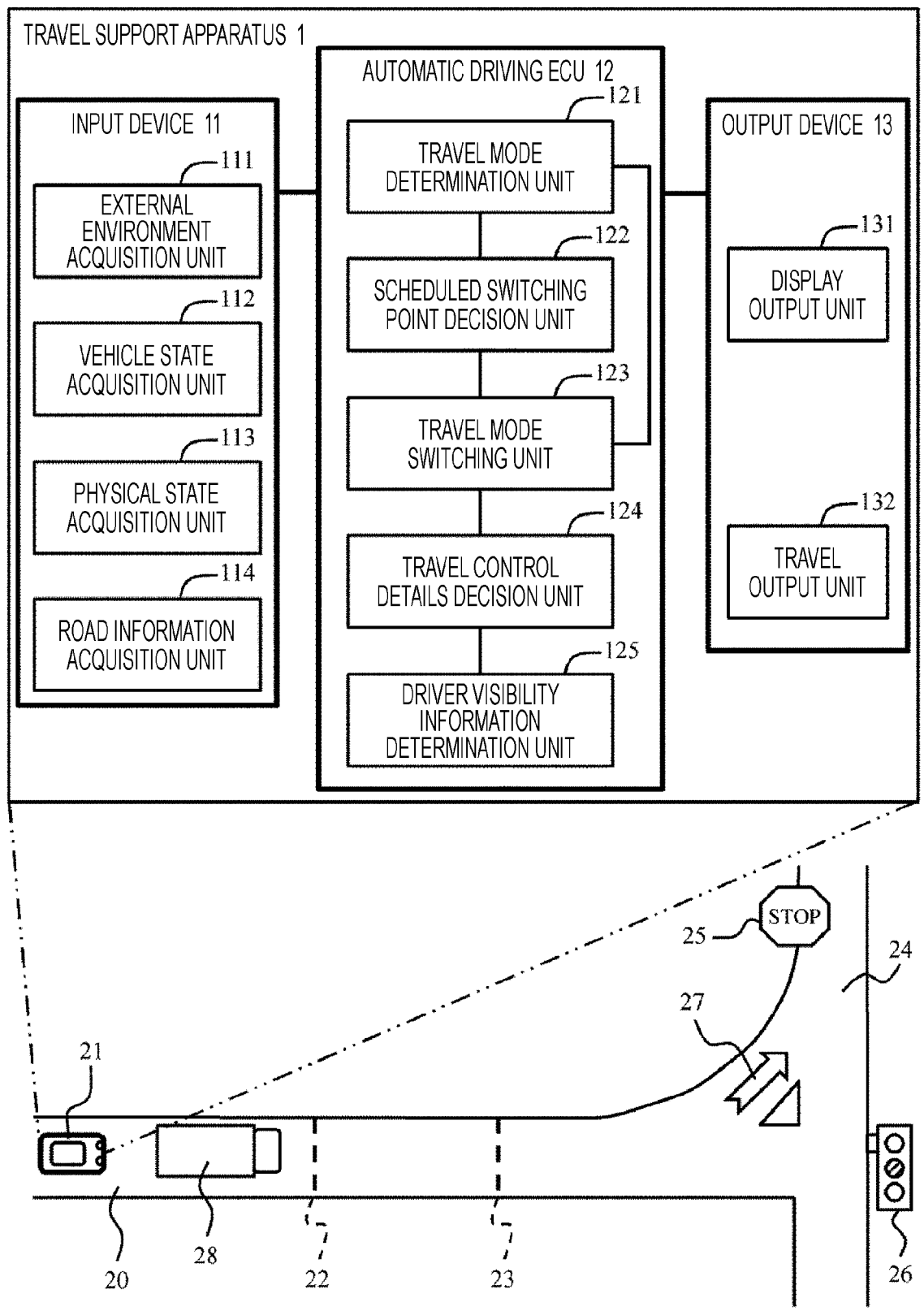
FIG. 1 is a block diagram illustrating an overall configuration of a moving object travel support apparatus.

An exemplary embodiment 1 will be described with reference to FIGS. 1 to 6. FIG. 1 is a block diagram illustrating an overall configuration of the travel support apparatus 1. The travel support apparatus 1 is provided in the vehicle 21 and performs travel control of the vehicle 21 and information presentation to the driver. The travel support apparatus 1 can allow the vehicle 21 to automatically travel to a preset destination. The travel support apparatus 1 can switch from the automatic travel mode to the manual travel mode in accordance with traffic conditions or the like. In the following description, the subject vehicle 21 including the travel support apparatus 1 will be referred to as a subject vehicle, in some cases.

The travel support apparatus 1 uses a computer system including, for example, a microprocessor, a memory, a communication circuit, an input/output circuit, a dedicated circuit, or the like. The travel support apparatus 1 includes functions such as an input device 11, an automatic driving ECU 12, and an output device 13, for example. Each of the functions 11 to 13 of the travel support apparatus 1 ensures redundancy by duplication or the like. Due to this redundancy, in a case where a failure of a main device is detected, it is possible to immediately switch operation to a sub device to continue travel support processing.

The input device 11 is a device that obtains various types of travel environment information. The input device includes, for example, an external environment acquisition unit 111, a vehicle state acquisition unit 112, a physical state acquisition unit 113, and a road information acquisition unit 114. The input device 11 is connected to the automatic driving ECU 12 and outputs information individually obtained by the external environment acquisition unit 111, the vehicle state acquisition unit 112, the physical state acquisition unit 113, and the road information acquisition unit 114, to the automatic driving ECU 12.

The external environment acquisition unit 111 functions as an environmental condition acquisition means that obtains environmental condition information around the vehicle 21. Examples of the applicable external environment acquisition unit 111 include in-vehicle devices such as an inter-vehicle communication device, a road-to-vehicle communication device, a camera, a laser sensor, and a sonar sensor (not illustrated). The external environment acquisition unit 111 can use these devices to obtain position information and the speed information of another vehicle, position information of an obstacle on the course, and speed information, for example. The external environment acquisition unit 111 mainly uses a sensor device that obtains visual information such as a camera and observes a video in front of the vehicle 21 in a traveling direction. This enables the external environment acquisition unit 111 to also function as an "external environment recognition device" that detects road information visually recognized by the driver. Examples of the road information visually recognized by the driver include a road sign 25, a traffic light 26, and a traveling route 27 drawn on a road surface.

For example, the vehicle state acquisition unit 112 functions as a means that obtains vehicle states such as position information, traveling direction information, and speed information of the subject vehicle 21. Examples of the applicable vehicle state acquisition unit 112 include a Global Positioning System (GPS), a gyro sensor, an acceleration sensor, and a wheel speed sensor. The GPS obtains position information of the vehicle 21. The gyro sensor and the acceleration sensor obtain a traveling direction of the vehicle 21. For example, the wheel speed sensor is attached to the wheel portion of the vehicle 21 and obtains a wheel speed of the vehicle 21.

The physical state acquisition unit 113 functions as a means that obtains physical states of the driver manually driving the vehicle 21. Examples of the applicable physical state acquisition unit 113 include a torque sensor attached to the shaft of the steering wheel, a center of gravity sensor attached to the driver's seat, and a driver monitor camera directed toward the driver. The torque sensor detects a hands-free state in which the driver releases one's hand from the steering wheel. The center of gravity sensor detects the posture of the driver. The driver monitor camera detects the driver's line of sight. Examples of the applicable physical state acquisition unit 113 include a biometric information sensor for detecting biometric information of the driver, such as the electrocardiogram, heart rate, blood pressure, muscle movement (myopotential), amount of perspiration, or the like, of the driver. The biometric information sensor can be provided in a steering wheel, for example.

The road information acquisition unit 114 obtains road network information, traffic rule information, and traffic safety facility information including nodes and links, for example. The road network information includes road structure information such as node detailed information (crossroads, T-shaped roads, or the like) and link detailed information (number of lanes, shape, or the like). Traffic rule information refers to the concept that not only includes traffic laws but also includes traffic manners commonly shared among the public. Traffic safety facility information refers to facilities installed to attract driver's visual recognition for traffic safety, such as traffic lights and road signs. The road information acquisition unit 114 may obtain the information from a storage medium that stores the information as necessary, or may obtain the information from a server on the network as necessary.

The automatic driving ECU 12 performs information processing related to travel control. The automatic driving ECU 12 mainly uses a computer including a CPU, a ROM, and a RAM (not illustrated), for example. The automatic driving ECU 12 includes, for example, a travel mode determination unit 121, a scheduled switching point decision unit 122, a travel control details decision unit 124, and a driver visibility information determination unit 125.

The automatic driving ECU 12 calculates a control command value for traveling control of the vehicle 21 on the basis of various types of information input from the input device 11, and outputs the calculated control command value to the output device 13. The control command value here not only includes control information for changing the physical state of the vehicle 21 via the actuator but also includes signal information for providing information to the driver via a display device (meter, speaker, etc.).

The travel mode determination unit 121 determines which of the automatic travel mode and the manual travel mode is suitable on the basis of a travel environment. The travel environment here refers to information including an external environment around the subject vehicle, the vehicle state of the subject vehicle 21, the physical condition of the driver, and the road information on the target route.

For example, on a snowy road where it is difficult to recognize a white line by an in-vehicle camera or on a tight curve on which the vehicle need to turn beyond a steering angle limit value, the travel mode determination unit 121 determines that the manual travel mode is suitable. Furthermore, the travel mode determination unit 121 determines that the manual travel mode is suitable also in a case where the function of the travel support apparatus 1 is impaired and continuation of automatic travel is determined to be difficult. A zone having determination that the manual travel mode is suitable is referred to as a manual travel zone. The travel in the manual travel mode is referred to as manual travel, and the travel in the automatic travel mode is referred to as automatic travel.

In this manner, the travel mode determination unit 121 determines that manual travel is suitable in a situation to be determined that automatic travel is difficult. However, for example, in a case where the driver is determined to be in a physical state not suitable for manual travel, for example, the driver is estimated to be sleeping or feel uneasy about driving, the travel mode determination unit 121 determines that the automatic travel is suitable.

In a case where the manual travel mode is determined to be suitable as a result of determination by the travel mode determination unit 121, the scheduled switching point decision unit 122 decides a scheduled switching point at which switching from the automatic travel mode to the manual travel mode is to be performed. Here, the scheduled switching point is a concept including a switching start point and a switching completion point.

A switching start point 22 and a switching completion point 23 are illustrated on a lower side of FIG. 1. The vehicle 21 is automatically traveling on a road 20. Ahead of the road 20, a manual travel zone 24 dedicated for travel in the manual travel mode is set. The portion in the vicinity of an entrance of the manual travel zone 24 includes a road sign 25, a traffic light 26, and a traveling route 27.

In FIG. 1, the switching start point 22 and the switching completion point 23 are set in view of a scheduled travel in the manual travel zone 24 by manual driving of the vehicle 21 currently being driven in the automatic driving. The switching start point 22 as a "switching start position" is a position on a target route for starting switching processing from the automatic drive mode to the manual drive mode. In other words, the switching start point 22 is a position of starting hand-over from automatic driving to manual driving. The switching start point 22 is set in front of the switching completion point 23 as viewed from the subject vehicle 21 on the basis of the time required for driving switching processing from automatic driving to manual driving.

The scheduled switching point decision unit 122 sequentially calculates arrival suspension time until the vehicle 21 reaches the switching start point 22 on the basis of the state of the vehicle 21 obtained by the vehicle state acquisition unit 112. In a case where the arrival suspension time becomes a predetermined time or less, the scheduled switching point decision unit 122 determines that the vehicle 21 is approaching or has reached the switching start point 22. The predetermined time may be a fixed value or a variable value.

The switching completion point 23 as a "switching completion position" can be set at an entrance of the manual travel zone 24. Examples of the entrance of the manual travel zone 24 include a start point of traffic regulation due to deep snow and an entrance to a tight curve. In other words, the switching completion point 23 is a position on the target route where switching processing from automatic travel to the manual travel must be completed. That is, the travel support apparatus 1 must complete the hand-over of the driving from the automatic travel to the manual travel from the switching start point to the switching completion point 23. Therefore, the setting of the switching completion point 23 needs to be preliminarily performed before the subject vehicle 21 reaches the manual travel zone 24.

A travel mode switching unit 123 switches the travel modes. The travel mode switching unit 123 may immediately switch the travel mode, or may perform switching over a certain period of time such as gradually transferring the driving operation to the driver.

The travel control details decision unit 124 uses a processing result of the scheduled switching point decision unit 122, a processing result of the driver visibility information determination unit 125, or the like, and constantly selects appropriate operation so as to decide a control command value used for the travel in the automatic travel mode. The decided control command value is output to the output device 13.

The driver visibility information determination unit 125 determines whether the driver can visually recognize road information such as traffic safety facility information and road network information provided frontward in a traveling direction of the vehicle 21. The determination processing is executed for each of pieces of road information. As will be described below with reference to FIG. 4, weights are given to the pieces of road information as determination targets in accordance with their impact on traffic safety. The greater the weight, the greater the impact on traffic safety. In other words, the greater the weight, the more the road information should be visually recognized by drivers. The weight may be set as a unique value for each of pieces of road information, or set as a value relative to other surrounding road information.

Here, a method of determination processing in the driver visibility information determination unit 125 will be described with reference to FIGS. 2 and 3 as an example.

Figure 2:
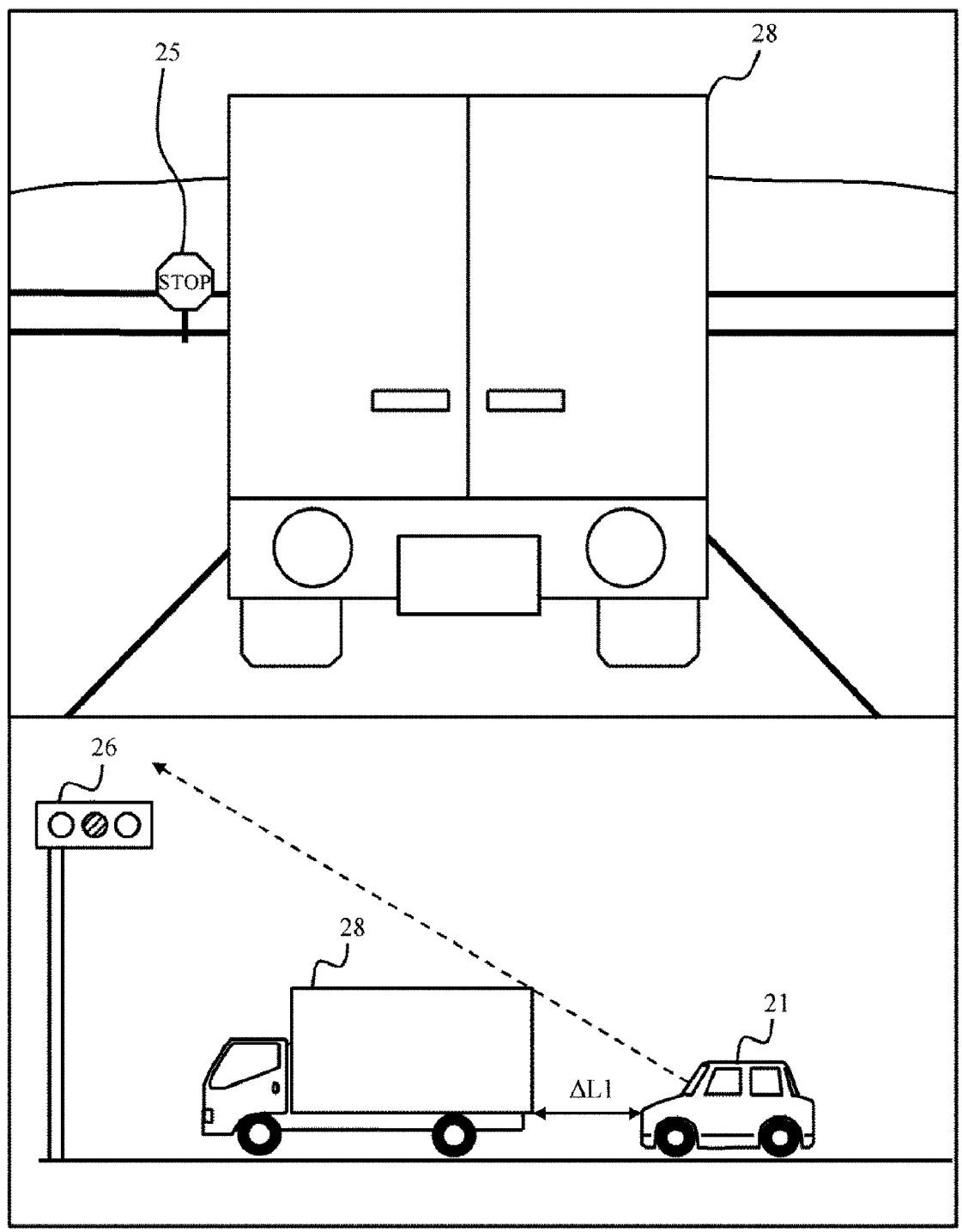
FIG. 2 is a view illustrating a state in which situational awareness at a scheduled switching point is hindered.

FIG. 2 illustrates a case in which a driver has difficulty in visually recognizing a frontward external environment (surrounding environment). The frontward external environment of the vehicle 21 is obtained from the external environment acquisition unit 111. In FIG. 3, road information (road sign 25, traffic light 26) exists frontward in the traveling direction. An obstacle 28 exists on a same lane as the subject vehicle 21.

Hereinafter, the obstacle 28 will be referred to as another vehicle 28 as an obstacle, or simply as another vehicle 28. As illustrated on the lower side of FIG. 2, an inter-vehicle distance ΔL1 between the subject vehicle 21 and another vehicle 28 (obstacle in this case) existing in front is short. For this reason, the external environment acquisition unit 111 cannot obtain road information such as the road sign 25 or the traffic light 26.

While the road sign 25 existing in the manual travel zone 24 can be identified by the road information acquisition unit 114, the traffic light 26 and the traveling route 27 cannot be identified by the vehicle external environment acquisition unit 111 because the obstacle 28 hinders visibility of the driver of the vehicle 21.

In this manner, the driver's visibility of road information is determined by whether the vehicle external environment acquisition unit 111 can obtain road information existing in the manual travel zone.

Figure 3:
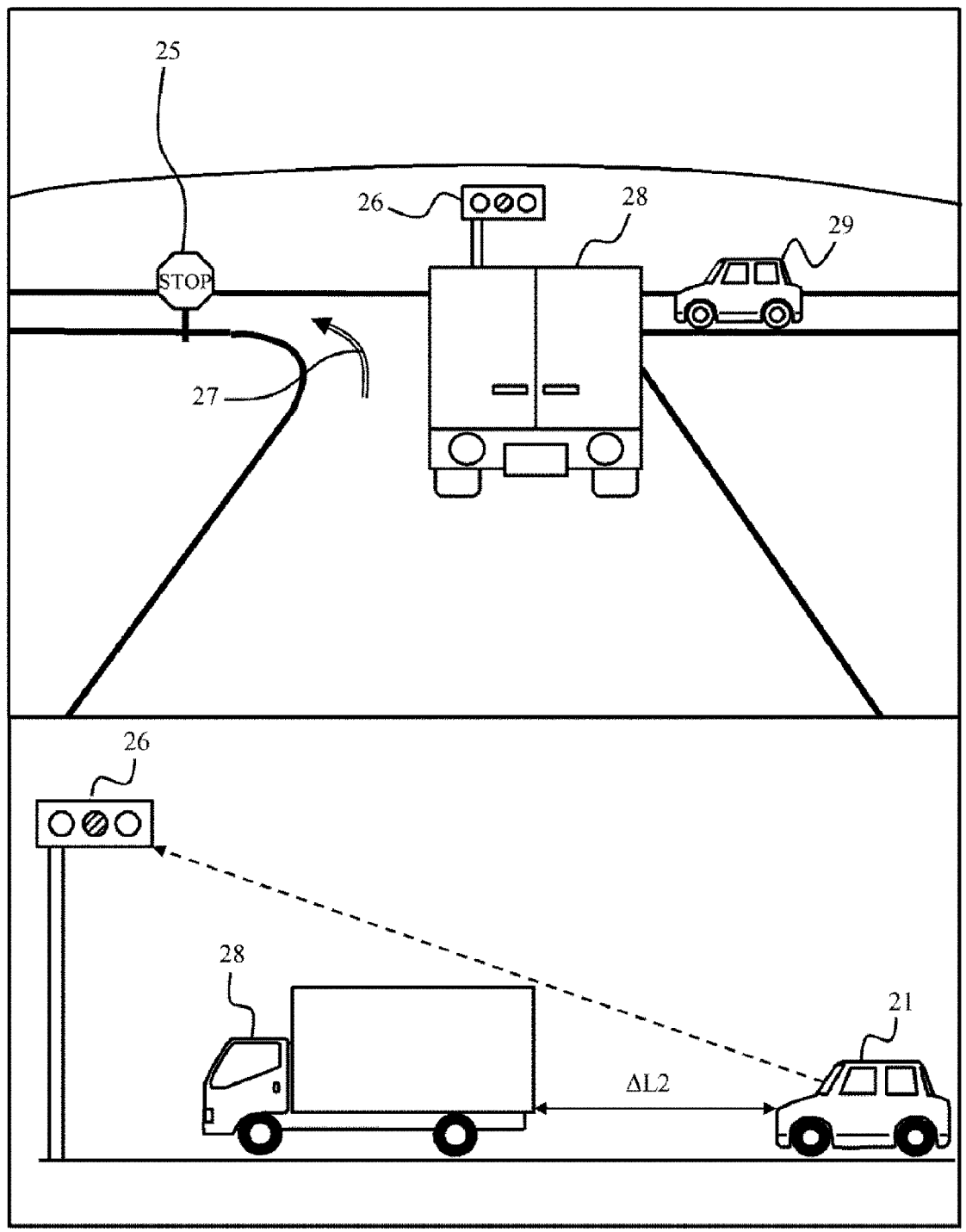
FIG. 3 is a view illustrating a state in which situational awareness at a scheduled switching point is enabled by decision of appropriate travel control details.

FIG. 3 illustrates a case in which a driver can visually recognize frontward external environment (surrounding environment). The travel control details decision unit 124 decides the appropriate travel control details in the automatic travel mode on the basis of the condition in the vicinity of the entrance of the manual travel zone. In the case of FIG. 3, the travel control details decision unit 124 increases an inter-vehicle distance ΔL2 between the vehicle 21 and the other vehicle 28 as an obstacle so as to ensure the forward visibility of the vehicle 21. With increased inter-vehicle distance ΔL2, the driver of the vehicle 21 can now visually recognize the road information (road sign 25 and traffic light 26) located in front of the vehicle 21. Furthermore, a vehicle 29 heading from the right direction to the left direction in FIG. 3 can also be visually recognized from the driver of the vehicle 21.

Description follows with reference back to FIG. 1. As illustrated in FIG. 1, the output device 13 is connected to the automatic driving ECU 12. The output device 13 receives various control command values output from the automatic driving ECU 12 and controls various output devices 131 and 132. The output device 13 includes a display output unit 131 and a travel output unit 132, for example.

The display output unit 131 serving as an "information providing unit" provides various types of information (for example, speed limit, lane departure warning, etc.) to an occupant (including the driver) of the vehicle 21. Examples of the display output unit 131 include an instrument panel, a display, or a speaker disposed in the vicinity of the driver's seat of the vehicle 21. The display output unit 131 may be a head-up display. Alternatively, a cellular phone, a portable information terminal (including a smartphone), a tablet personal computer, or the like, held by an occupant, may be used as part or all of the information providing unit.

The travel output part 132 controls travel of the vehicle 21 on the basis of a control command value input from the automatic driving ECU 12. The travel output unit 132 includes various actuators installed for changing the steering angle, acceleration/deceleration, braking pressure of the vehicle 21; and a control unit (not illustrated) that drives the individual actuators.

Examples of the actuator include a steering actuator for applying a steering torque, an actuator for adjusting the opening degree of an engine throttle valve, and a brake actuator for adjusting a brake hydraulic pressure.

FIG. 4 illustrates a configuration example of a visibility information determination table T1. For example, the visibility information determination table T1 manages an identifier C11, road information C12, and a weight C13 in association with each other. Examples of the road information C12 include visual recognition targets such as the road sign 25, the traffic light 26, the traveling route 27, and other vehicles 28 and 29. The weight C13 is set for each of types of road information. The weight C13 is set such that the greater the impact on traffic safety, the larger the value of weighting.

For example, since the display of "traffic light" is basic information on traffic safety, it is important to visually recognize the traffic information (display state). Accordingly, in a case where the road information C12 is "traffic light", the largest weight is set. In contrast, for example, in the case of "road sign" like no-parking which is considered to have a little impact on traffic safety, a smaller weight is set. Furthermore, for example, in a case where the road information C12 is "other vehicle", which is highly likely to come into contact with the subject vehicle, there would be a great impact on traffic safety, and thus, a large weight is set.

FIG. 5 illustrates a configuration example of a travel control details decision table T2. For example, the table T2 used for deciding the travel control details is managed in association with an identifier C21, road information C22, and details C23. The road information C22 is similar to the road information C12 described in FIG. 4. The details C23 illustrate travel control details according to the road information C22.

An example of action (travel control details) appropriate for visually recognizing a display state of a "traffic light" is to "increase an inter-vehicle distance". An example of action appropriate for "other vehicles with high probability of contact" is to "decelerate greatly and let it pass". In order to visually recognize the "road sign" having a great impact on traffic safety, it may be preferable to take action such as "laterally shift the position of subject vehicle 21".

The visibility information determination table T1 of FIG. 4 is used by the driver visibility information determination unit 125. The travel control details decision table T2 of FIG. 5 is used by the travel control details decision unit 124. The tables T1 and T2 of FIGS. 4 and 5 may be integrated with each other.

Figure 6:
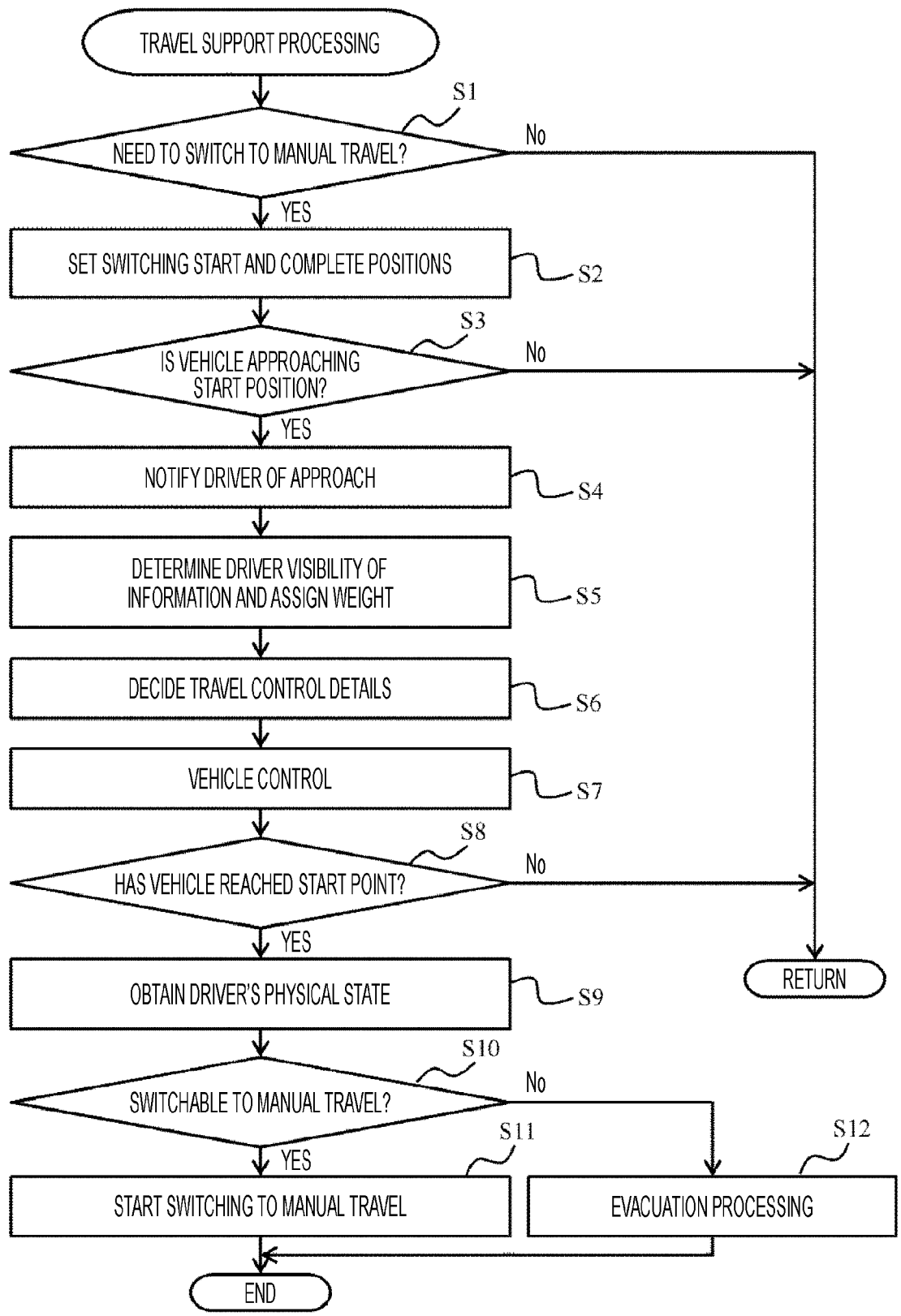
FIG. 6 is a flowchart of travel support processing.

Operation of the travel support apparatus 1 will be described with reference to FIG. 6. FIG. 6 is a flowchart illustrating a characteristic processing flow executed by the travel support apparatus 1. Note that the following will describe the control when the automatic travel mode of performing automatic travel to a preliminarily input destination is switched to the manual travel mode.

As a precondition, the vehicle 21 as a target of this processing is assumed to be in the automatic travel mode in which various actuators are driven in accordance with the control details generated by the travel control details decision unit 124. The present processing is assumed to be executed at a predetermined timing or in a predetermined period during automatic travel of the vehicle 21 along a target route to the destination.

The travel mode determination unit 121 determines whether switching to manual driving (manual travel mode) is necessary (S1) by analyzing a travel environment (surrounding environment). In a case where switching to the manual driving is determined to be necessary (S1: YES), the scheduled switching point decision unit 122 sets each of the switching start point 22 and the switching completion point 23 (S2). In a case where switching to manual driving is unnecessary (S1: NO), the processing returns.

The scheduled switching point decision unit 122 monitors whether the subject vehicle 21 is approaching the switching start point 22 (S3). When the scheduled switching point decision unit 122 has determined that the subject vehicle 21 is approaching the switching start point 22 (S3: YES), the travel control details decision unit 124 notifies the driver of the approach (S4). For example, a message of "We will arrive at the point of switching to manual driving soon. Please start preparation." will be output as voice from a speaker or as texts on the display.

Simultaneously with this notification, the driver visibility information determination unit 125 determines whether the driver can visually recognize pieces of road information (the road sign 25, the traffic light 26, the traveling route 44) including traffic safety facility information and the road network information within the manual travel zone, and then, assigns weights corresponding to the impact on traffic safety, to the pieces of road information (S5). This determination uses the visibility information determination table T1 described in FIG. 4.

The travel control details decision unit 124 uses the travel control details decision table T2 described in FIG. 5 and thereby decides travel control details of the vehicle (S6). The travel control details are decided so as to maximize the total of the weights of the road information visually recognized by the driver.

In other words, the travel control details decision unit 124 decides the control details that allow the driver to visually recognize the maximum amount of road information with higher importance. For example, it is assumed that the weight of the traveling route 27 is set to be higher than the road signs 25, and the driver can visually recognize the road signs 25 whereas the driver cannot visually recognize the traveling route 27 in a travel condition at a current point. It is assumed, on the other hand, that controlling the vehicle 21 so that the traveling route 27 can be visually recognized would make it difficult to visually recognize the road sign 25. In this case, the travel control details decision unit 124 decides to control the travel of the vehicle 21 so that the traveling route 27 can be visually recognized.

As another example, in a condition where the driver of the vehicle 21 cannot visually recognize the traffic light 26 by the obstacle 28 in front of the vehicle 21, it would be sufficient to increase the inter-vehicle distance with the obstacle 28 in front of the vehicle 21. Furthermore, in a case where the traveling route 27 cannot be visually recognized, it is also effective to bring the vehicle 21 to the left side, for example, so that the traveling route 27 can be visually recognized. Note that the travel control details are not limited to the movement of the vehicle 21, and also include displaying of road information on an instrument panel or the like, as part of the travel control details. It would be desirable to select a plurality of items of travel control details at a time and execute the items simultaneously when it is possible to be executed without conflicting with the output of the travel control details decision unit 124.

Description follows with reference back to FIG. 1. The display output unit 131 and the travel output unit 132 control various actuators or the like on the basis of the decided travel control details (S7). It is desirable that the control in step S7 has been completed before the vehicle 21 reaches the switching start point 22 of the drive mode (travel mode).

The scheduled switching point decision unit 122 determines whether the vehicle 21 has reached the switching start point 22 (S8). In a case where the vehicle is determined to have reached the switching start point 22 (S8: YES), the travel mode determination unit 121 obtains physical states of the driver (S9). The travel mode determination unit 121 determines whether the driver is in a state capable of taking over driving on the basis of the obtained driver's physical states (S10). The control is continuously performed even when the vehicle control in step S7 has not been completed at a point where the vehicle has reached the switching start point 22. In a case where the vehicle 21 has not reached the switching start point 22 (S8: NO), the processing returns.

In a case where the travel mode determination unit 121 determines that the driver can take over the driving (S10: YES), the travel mode switching unit 123 starts switching processing to the manual travel (S11).

In contrast, in a case where it is determined that switching to manual driving is not possible by the switching completion point 23 (S9: NO), the travel mode switching unit 123 would not perform switching from the automatic travel to the manual travel and selects predetermined evacuation processing such as parking the vehicle at a roadside pull-off (S12).

According to the present exemplary embodiment constituted as described above, road information of the manual travel zone is visually recognized by the driver at the time of switching from the automatic travel mode to the manual travel mode. This makes it possible to suppress occurrence of an operation error at the time of manual traveling, leading to achievement of safe driving. For example, the travel support apparatus 1 of the present exemplary embodiment can be used to prevent operation of the driver such as entering an intersection without noticing the red light of the traffic light 26 ahead or failing to notice a tight curve and hitting sudden braking immediately before the tight curve.

In other words, the travel support apparatus 1 according to the present exemplary embodiment can support driving plans of the driver at the time of switching to the manual travel. Moreover, the travel support apparatus 1 controls the vehicle 21 to enable the driver to visually recognize the road information, leading to produce a condition that facilitates driver's operation of taking over the driving. As a result, the travel support apparatus 1 can support appropriate travel of the vehicle 21, thereby improving reliability and usability.

Second Exemplary Embodiment

A second exemplary embodiment will be described with reference to FIGS. 7 and 11. Each of the following exemplary embodiments including the present exemplary embodiment corresponds to a modification of the first exemplary embodiment. Accordingly, a difference from the first exemplary embodiment will be mainly described.

Figure 7:
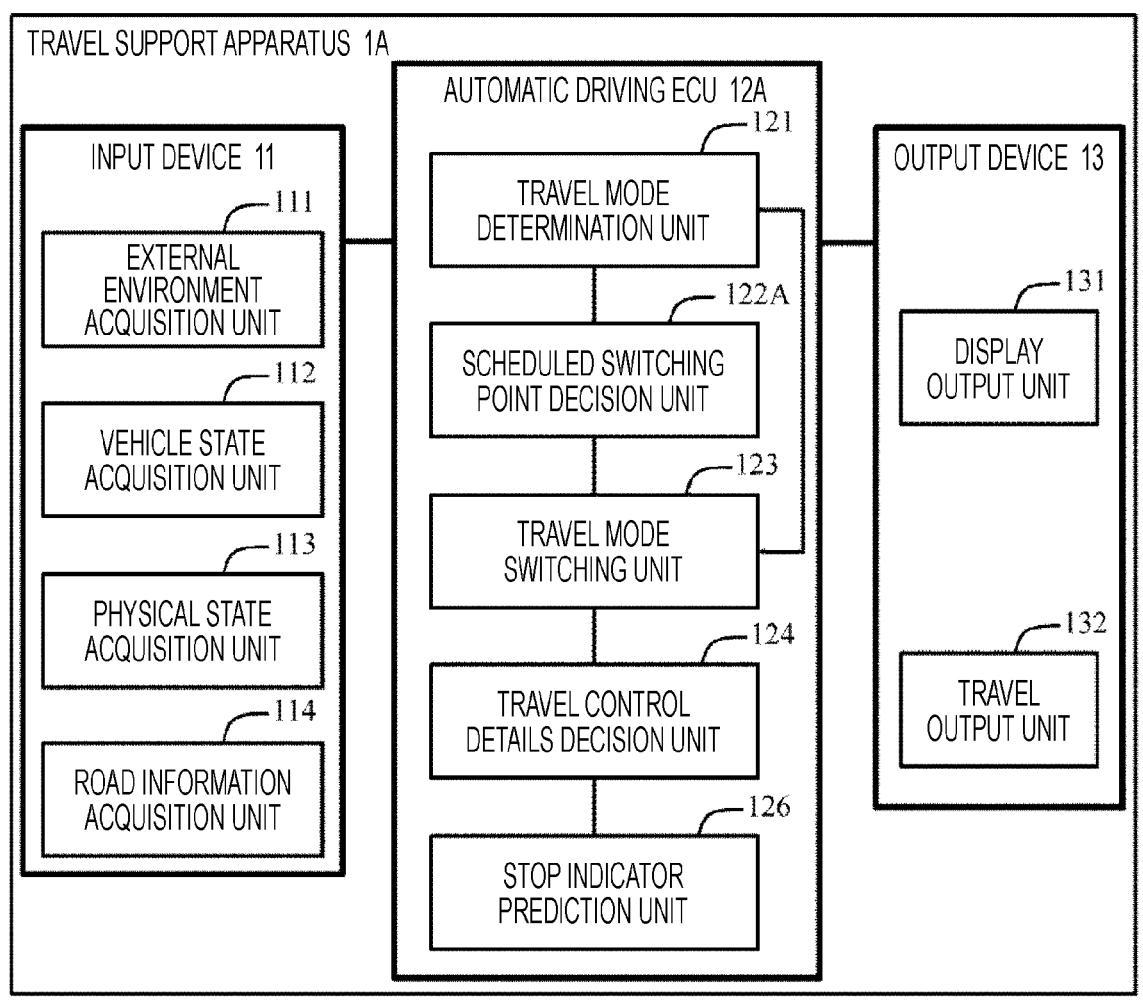
FIG. 7 is a block diagram of a moving object travel support apparatus according to a second exemplary embodiment.

FIG. 7 is a block diagram illustrating a functional configuration of a travel support apparatus 1A. The travel support apparatus 1A according to the present exemplary embodiment is identical to the travel support apparatus 1 illustrated in FIG. 1 except that a functional configuration of an automatic driving ECU 12A differs from the first exemplary embodiment. The automatic driving ECU 12A according to the present exemplary embodiment includes the travel mode determination unit 121, the travel mode switching unit 123, and the travel control details decision unit 124 similar to those of the automatic driving ECU 12 described in the first exemplary embodiment. A scheduled switching point decision unit 122A of the present exemplary embodiment executes characteristic processing as described below. Furthermore, the automatic driving ECU 12A of the present exemplary embodiment includes a stop indicator prediction unit 126 that predicts display of a stop indicator (not illustrated).

In addition to the processing by the scheduled switching point decision unit 122 in the first exemplary embodiment, the scheduled switching point decision unit 122A decides a scheduled switching point on the basis of installation points of installed objects on the road (for example, a traffic light, a railway crossing, a stop sign, or the like) demanding a stop of the vehicle 21. In this case, the installed object on the road that requests a stop of the vehicle 21 is referred to as a stop indicator.

Figure 8:
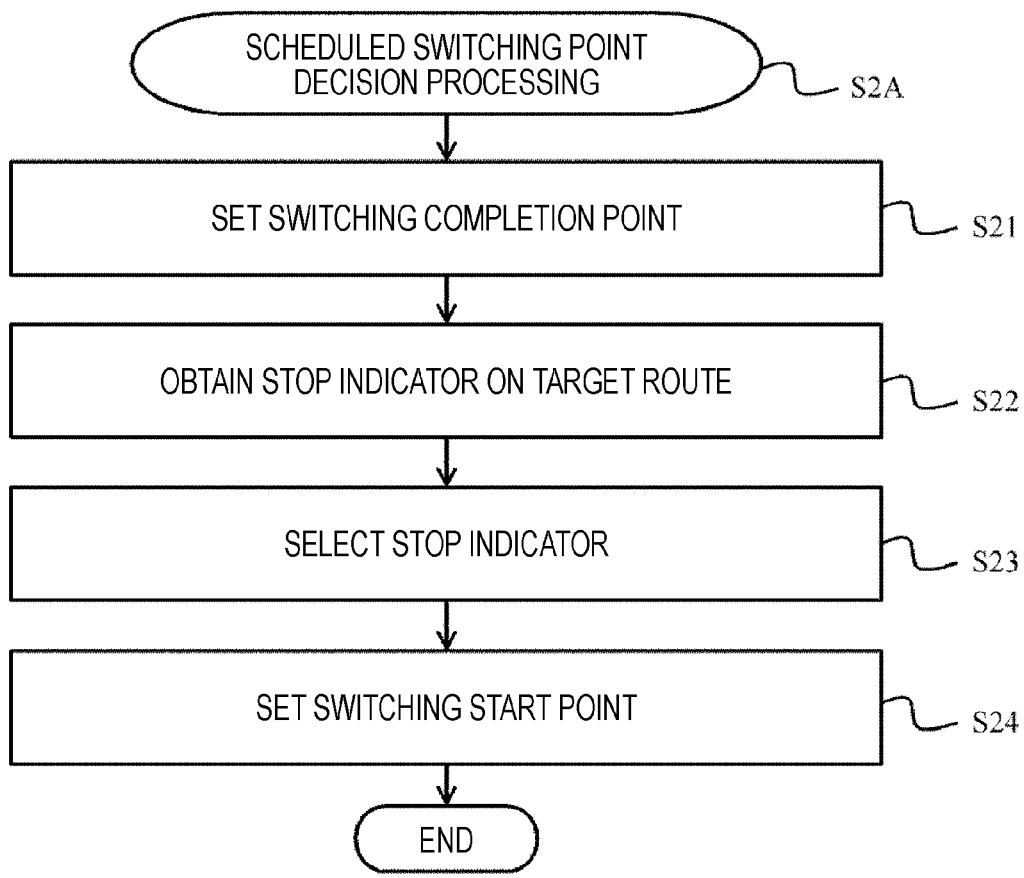
FIG. 8 is a flowchart illustrating processing of deciding a scheduled switching point.

Operation of the scheduled switching point decision unit 122A to decide a scheduled switching point will be described with reference to FIG. 8. FIG. 8 is a flowchart illustrating a characteristic processing flow when the scheduled switching point decision unit 122A decides the scheduled switching point. The processing illustrated in FIG. 8 is executed in place of the setting (S2) of the switching start point 22 and the switching completion point 23 in the first exemplary embodiment.

The scheduled switching point decision unit 122A sets the switching completion point 23 at an entrance of the manual travel zone 24 (S21). The setting of the switching completion point 23 is similar to the setting in the first exemplary embodiment. The scheduled switching point decision unit 122A obtains a stop indicator existing on the target route of the subject vehicle 21 (S22), and then, selects one stop indicator optimum for setting the switching start point 22 (S23). The optimum stop indicator here is a stop indicator located in more frontward than the switching completion point 23 as viewed from the subject vehicle 21 and closest to the switching completion point 23.

The scheduled switching point decision unit 122A sets a point at which the vehicle 21 can safely stop around the stop indicator installation point selected in step S23, as the switching start point 22 (S24). For example, in a case where a traffic light is selected as a stop indicator, a stop line at the intersection of the traffic light is to be set as the switching start point. In a case where a railroad crossing is selected as a stop indicator, a stop line at an entrance of the railway crossing is to be set as the switching start point. In a case where a parking lot is selected as a stop indicator, a certain position or a parking zone in the parking lot is to be set as the switching start point.

In this manner, the scheduled switching point decision unit 122A sets the switching start point 22 on the basis of the stop indicator.

Furthermore, when the subject vehicle 21 stops in the vicinity of the switching start point 22, the scheduled switching point decision unit 122A determines that the subject vehicle 21 has reached the switching start point 22. That is, when the distance between the position of the subject vehicle 21 and the switching start point 22 is a predetermined distance or less and the vehicle speed of the subject vehicle 21 is 0, it is determined that the vehicle has reached the switching start point 22. Accordingly, the switching processing to the manual travel is executed in a state where the subject vehicle 21 is stopped. Note that it is desirable that the predetermined distance be set on the basis of the type of the stop indicator. Moreover, switching from the automatic travel mode to the manual travel mode is not limited to the case where the subject vehicle 21 is completely stopped. Switching may be performed also in a case where the subject vehicle 21 decelerates to a predetermined speed or less.

The stop indicator prediction unit 126 predicts a future operation state (for example, change to a red light in two minutes, or the like) on the basis of a current operation state of the stop indicator. The predicted future operation state is provided to the travel control details decision unit 124. Note that the current operation state of the stop indicator is obtained, for example, via the external environment acquisition unit 111. In addition, the stop indicator prediction unit 126 may directly obtain the future operation state of the stop indicator from the stop indicator via the vehicle external environment acquisition unit 111.

Figure 9:
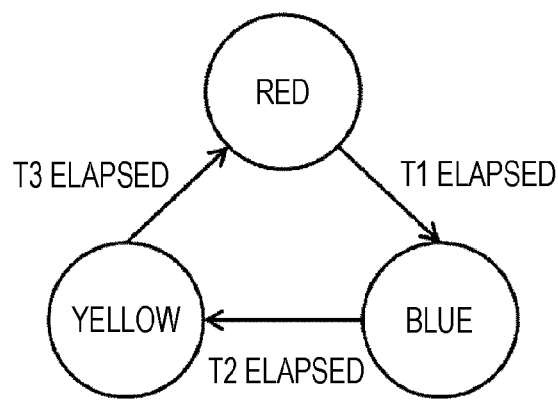
FIG. 9 is a diagram illustrating a method of predicting an operation state of a stop indicator.

A method of predicting the operation state of the stop indicator by the stop indicator prediction unit 126 will be described with reference to FIG. 9. As an example, FIG. 9 illustrates a state transition model in a lighting state of a traffic light installed in general. As illustrated in FIG. 9, the lighting state of the traffic light changes over time from red to blue, blue to yellow, and yellow to red. The red lighting time is defined as T1, the blue lighting time as T2, and the yellow lighting time as T3.

For example, it is supposed that the stop indicator prediction unit 126 has obtained a lighting state of "blue is being displayed for "a" second" as the current operation state of the traffic light. The stop indicator prediction unit 126 uses the lighting state as an input and performs prediction based on the state transition model illustrated in FIG. 9. Accordingly, the stop indicator prediction unit 126 can obtain future operation states that "yellow would be displayed in T2–a second", "red would be displayed in T2+T3–a second", or the like.

For prediction, the stop indicator prediction unit 126 needs to grasp the state transition model of the stop indicator as a prediction target. The state transition model may be obtained via the external environment acquisition unit 111 or may be obtained via the road information acquisition unit 114.

The above is an example of a method of predicting operation states of traffic lights. For a stop indicator having no state transition, such as a stop sign, the stop indicator prediction unit 126 may provide a predetermined state without making above-described prediction. Alternatively, prediction may be performed assuming that state transition model has a constant operation state at any time.

Figure 10:
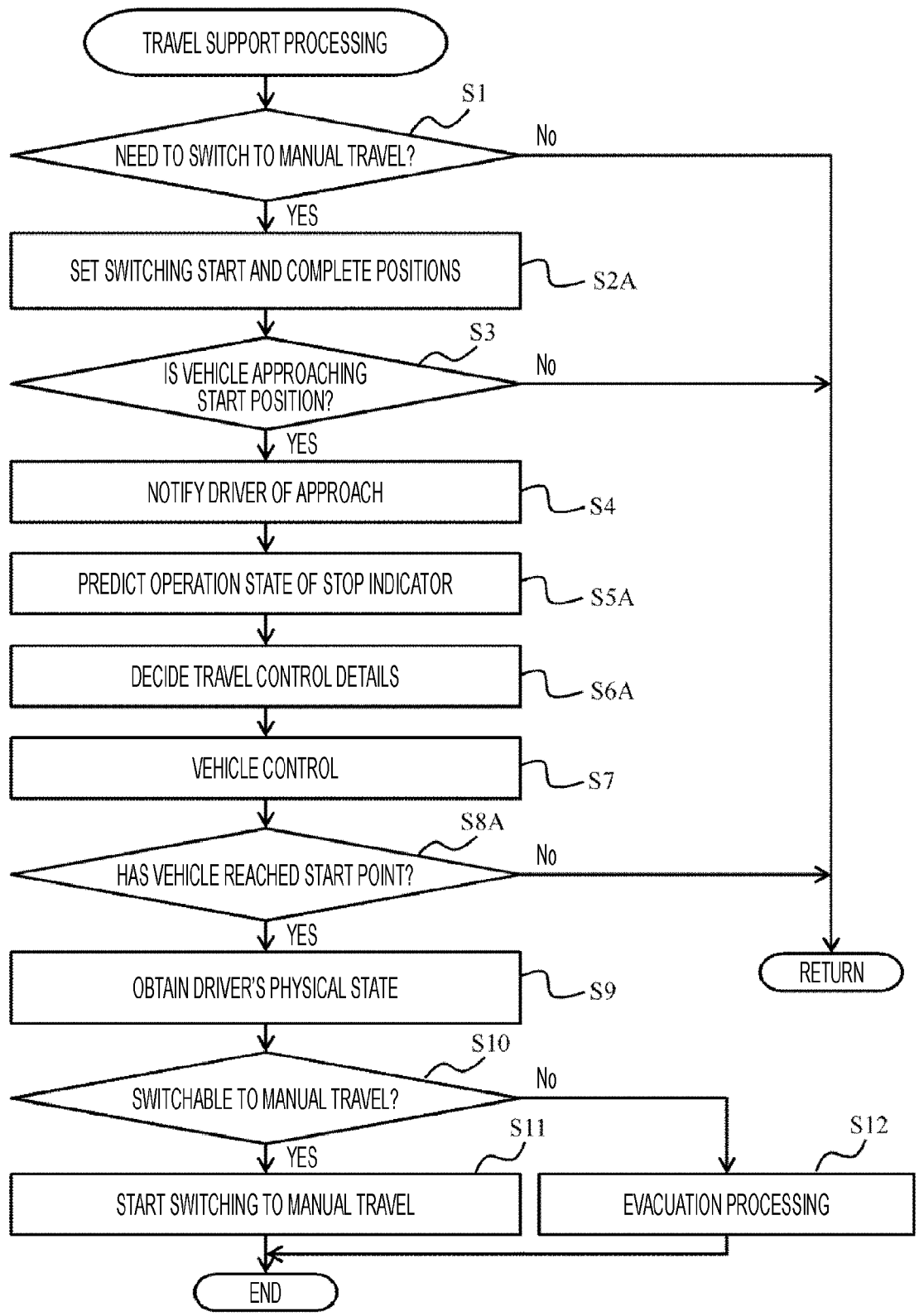
FIG. 10 is a flowchart of travel support processing.

Operation of the travel support apparatus 1A will be described with reference to FIG. 10. FIG. 10 is a flowchart illustrating a characteristic processing flow executed by the travel support apparatus 1A according to the present embodiment.

The travel support apparatus 1A executes (S2A) the processing of deciding the scheduled switching point described in FIG. 8 instead of setting of the scheduled switching point (S2) in the first exemplary embodiment. In addition, the travel support apparatus 1A executes vehicle control based on the operation state of the following stop indicator, instead of the vehicle control based on the visual recognition condition.

When the scheduled switching point decision unit 122A determines that the subject vehicle 21 is approaching the switching start point 22 (S3: YES), the travel control details decision unit 124 notifies the driver of the approach (S4). At the same time, the stop indicator prediction unit 126 predicts an operation state of the stop indicator selected by the scheduled switching point decision unit 122A in order to set the switching start point 22 (S5A).

On the basis of a prediction result of the stop indicator operation state, the travel control details decision unit 124 decides the travel control details so that the vehicle 21 stops at the switching start point 22 (S6A). The decided travel control details is transferred to the output device 13. The display output unit 131 and the travel output unit 132 control various devices in accordance with the decided travel control details (S7). For example, it is assumed that a traffic light is selected as a stop indicator and that a state where the signal would have been changed to a red light in T seconds has been obtained as a result of predicting the operation state of the traffic light. At this time, in a case where the distance from the current position of the subject vehicle to the switching start point 22 is a distance D, the travel control details decision unit 124 controls the vehicle 21 as illustrated in the lower side of FIG. 11.

Figure 11:
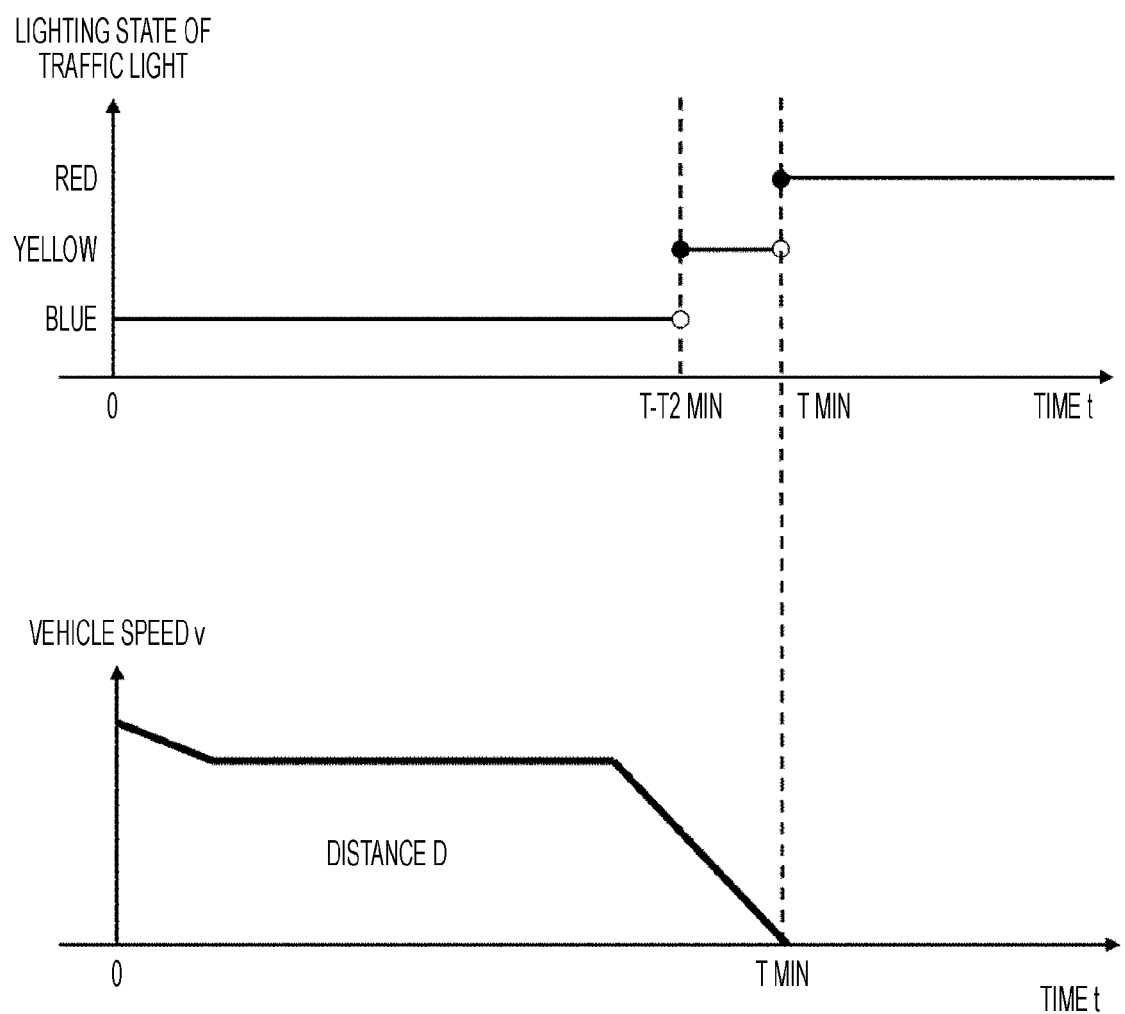
FIG. 11 is a graph illustrating a relationship between a state of a stop indicator and a vehicle speed.

FIG. 11 illustrates an operation example of the travel control details decision unit 124. The upper side of FIG. 11 is the lighting state of the traffic light at time t. The lower side of FIG. 11 is a vehicle speed v of the subject vehicle 21 at time t. FIG. 11 defines the time at which an operation state prediction result is obtained as 0.

In FIG. 11, the vehicle speed v is decreased in order to move the subject vehicle 21 by the distance D and stop the vehicle 21 after T seconds (time of switching to the red light). The travel control details decision unit 124 decides the travel control details that allows the subject vehicle 21 to be stopping at the switching start point 22.

Description follows with reference back to FIG. 10. The scheduled switching point decision unit 122A determines whether the subject vehicle 21 has reached the switching start point 22 (S8A). As described above, in a case where the vehicle speed of the subject vehicle 21 becomes 0 near the switching start point 22, the scheduled switching point decision unit 122A determines that the subject vehicle 21 has reached the switching start point 22. The following steps S9 to S12 are similar to those of the first exemplary embodiment, and thus, the description will be omitted.

The present exemplary embodiment configured like this has functional effects similar to the first exemplary embodiment. Furthermore, according to the present exemplary embodiment, the switching start point 22 is decided on the basis of the stop indicator, and the vehicle 21 is controlled so that the vehicle speed of the subject vehicle 21 becomes 0 at the switching start point 22. This enables, in the present exemplary embodiment, execution of switching processing to manual travel in a state where the subject vehicle 21 stopped. As a result, it is possible to more safely switch to the manual travel mode as compared with the case where the subject vehicle 21 is switched from the automatic travel mode to the manual travel mode while the subject vehicle is traveling in the lane.

Furthermore, according to the present exemplary embodiment, the subject vehicle 21 is stopped with little change in the surrounding environment. This facilitates visual recognition of the surrounding condition by the driver. Furthermore, according to the present exemplary embodiment, it is possible to ensure the time for the driver to confirm the display contents of the display device, enabling the driver to further easily create drive plan in the manual travel zone. As a result, it is possible to reduce human error such as entering a different route by mistake.

Third Exemplary Embodiment

A third exemplary embodiment will be described with reference to FIGS. 12 and 13. The present exemplary embodiment to be described is a case where the first exemplary embodiment and the second exemplary embodiment are combined.

Figure 12:
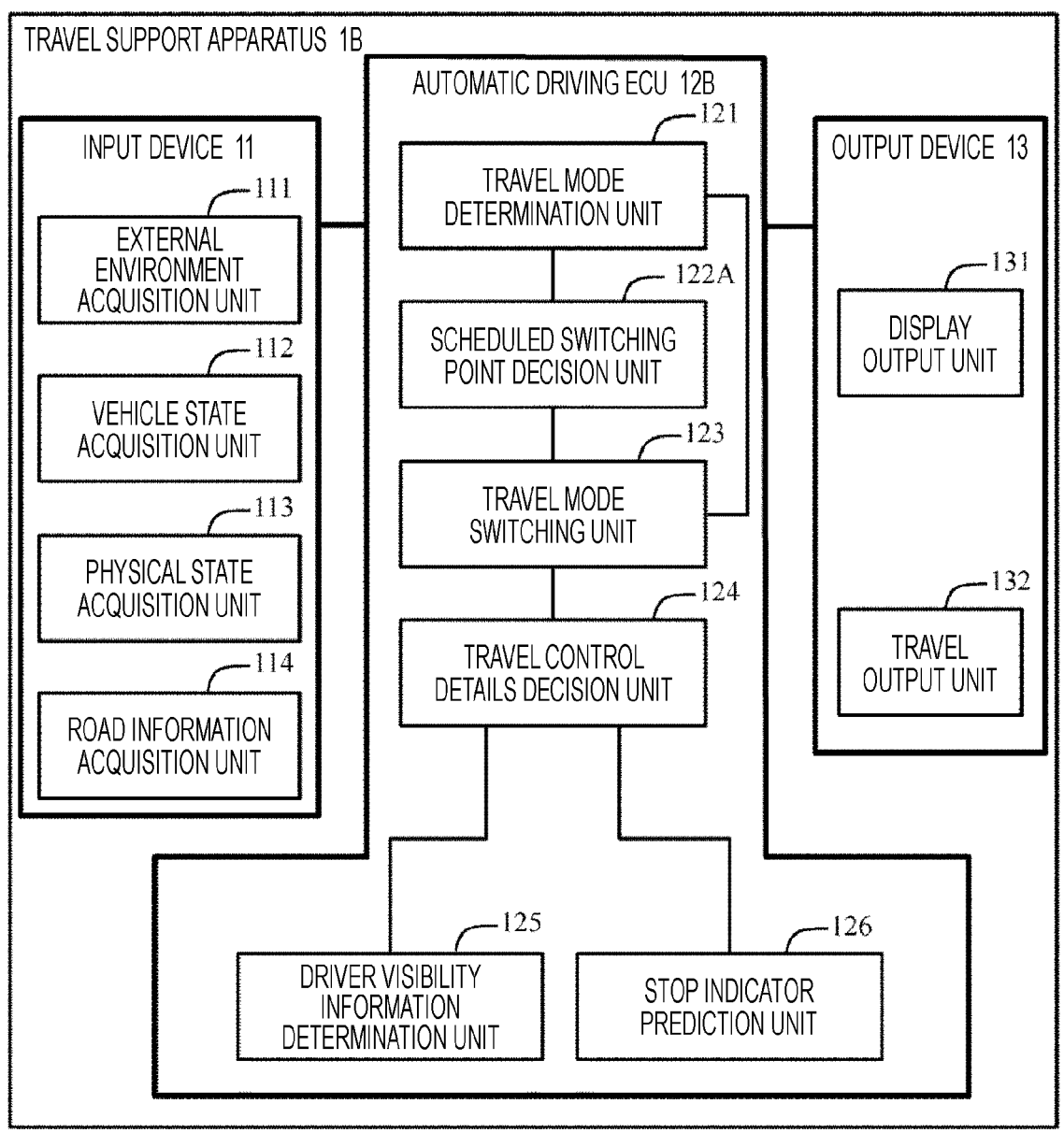
FIG. 12 is a block diagram of a moving object travel support apparatus according to a third exemplary embodiment.
Figure 13:
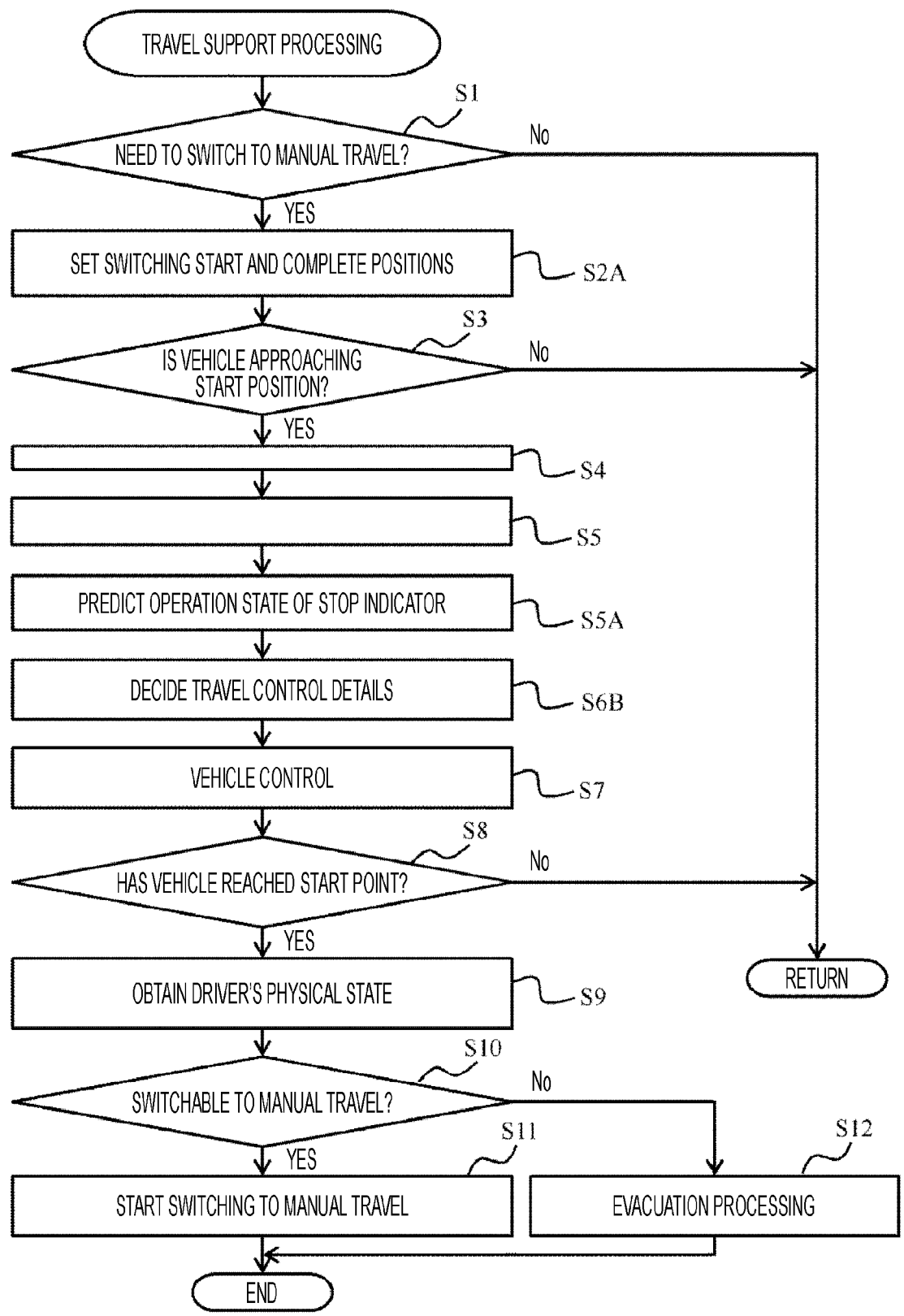
FIG. 13 is a flowchart of travel support processing.

FIG. 12 is a block diagram illustrating a functional configuration of a travel support apparatus 1B according to the present exemplary embodiment. The travel support apparatus 1B is generally identical to the travel support apparatus 1A described in FIG. 7 except that a functional configuration of an automatic driving ECU 12B is different. The travel support apparatus 1B of the present exemplary embodiment has a configuration in which a driver visibility information determination unit 125 has been added to the automatic driving ECU 12A of the travel support apparatus 1A.

Operation of the travel support apparatus 1B will be described with reference to FIG. 13. FIG. 13 is a flowchart illustrating a characteristic processing flow executed by the travel support apparatus 1B according to the present embodiment. The flowchart of FIG. 13 is different from the flowchart of FIG. 10 in that the visual recognition determination of the road information ahead of the vehicle by the driver visibility information determination unit 125 and point assignment (S5) have been added prior to the prediction of stop indicator operation state by the stop indicator prediction unit 126 (S5A). The travel control details decision unit 124 executes decision of the control details of the vehicle (S6B) as follows on the basis of the information calculated by the driver visibility information determination unit 125 and the stop indicator prediction unit 126.

Similarly to the description in step S6A of FIG. 10, the travel control details decision unit 124 decides the travel control details indicating the stop of the subject vehicle 21 at the switching start point 22 (S6B). Furthermore, the travel control details decision unit 124 corrects the travel control details to maximize the total weights of the road information visually recognizable by the driver at the switching start point 22 (S6B). That is, the correction is made to produce a condition where the driver visually recognizes the larger amount of road information of higher importance when the subject vehicle 21 stops at the switching start point 22.

For example, it is assumed that the switching start point 22 is set to a stop line at an intersection with a traffic light. It is also assumed that a tall vehicle 28 such as a truck is traveling in front and it is detected that the tall vehicle 28 is about to stop at the intersection. In this case, the travel control details decision unit 124 corrects the travel control details so that the vehicle 21 can stop at a position where the driver can visually recognize important road information (for example, the traffic light 26, the traveling route 27, etc.). Examples of the travel control details include stopping at a distance from the front truck 28, or stopping the vehicle 21 on the right side of the lane. Moreover, the travel control details are not limited to the movement of the vehicle 21, and also include displaying of road information on a display device that can be confirmed from the driver.

The present exemplary embodiment configured like this has functional effects similar to the first and second exemplary embodiments. Furthermore, according to the present exemplary embodiment, it is possible to produce a condition in which the subject vehicle 21 is stopped at the switching start point 22 and the road information can be visually recognized from the stop position. Therefore, according to the travel support apparatus 1B of the present exemplary embodiment, it is possible to eliminate the driver's concern about the reason for the stoppage of the subject vehicle 21 at that position and about the condition of the road ahead. As a result, the present exemplary embodiment enables the driver to be mentally stable in creating a driving plan.

In this manner, when the vehicle 21 is stopped in the vicinity of the switching start point 22, the travel support apparatus 1B according to the present exemplary embodiment can correct the stop position on the basis of the driver's visual recognition condition with respect to the surrounding environment. This makes it possible to stop the vehicle 21 at a position where the driver can visually recognize road information of the switching start point 22 and the manual travel zone 24, enabling producing a condition in which the driver can easily take over the driving.

The present invention is not limited to the above-described exemplary embodiments, and may include various types of modification. For example, the above-described embodiments give detailed explanation just to allow the present invention to be clearly understood. Therefore, the present invention is not limited to the case having all of the configurations. Further, a part of the configuration of an embodiment can be replaced by the configuration of another embodiment. Furthermore, a configuration of another embodiment can be added to the configuration of an embodiment. Furthermore, it is possible to modify a portion of the configuration of each of the embodiments, such as addition, deletion, and replacement from another configuration.

In addition, the technical features included in the above-described embodiments are not limited to the combinations specified in the claims, and can be combined as appropriate.

REFERENCE SIGNS LIST 1, 1A, 1B travel support apparatus
11 input device
12, 12A, 12B automatic driving ECU
13 output device
21 subject vehicle
22 switching start point
23 switching completion point
24 manual travel zone
25 road sign
26 traffic light
27 traveling route
28 obstacle
111 external environment acquisition unit
112 vehicle state acquisition unit
113 physical state acquisition unit
114 road information acquisition unit
121 travel mode determination unit
122, 122A scheduled switching point decision unit
123 travel mode switching unit
124 travel control details decision unit
125 driver visibility information determination unit
126 stop indicator prediction unit
131 display output unit
132 travel output unit

The invention claimed is:

1. A moving object travel support apparatus capable of switching between a manual travel mode and an automatic travel mode, the moving object travel support apparatus comprising:
a travel mode determination unit that determines which travel mode is to be selected out of a manual travel mode and an automatic travel mode;
a scheduled switching point decision unit that decides a scheduled switching point at which the automatic travel mode is switched to the manual travel mode when the travel mode determination unit selects the manual travel mode; and
a travel control details decision unit that decides travel control details at the time of travel in the automatic travel mode up to the scheduled switching point on the basis of a condition of a predetermined manual travel zone including the scheduled switching point
wherein the travel control details decision unit decides the travel control details by evaluating a visual recognition condition of a driver toward visual recognition targets included in a surrounding environment of the predetermined manual travel zone wherein weights are given to said visual recognition targets in accordance with their impact on traffic safety.

2. The moving object travel support apparatus according to claim 1, wherein the travel control details decision unit estimates the visual recognition condition of the driver on the basis of an image recognition result of an external environment recognition device that recognizes an external condition of the moving object as an image.

3. The moving object travel support apparatus according to claim 1, wherein the scheduled switching point decision unit decides a switching start position at which switching processing from the automatic travel mode to the manual travel mode is started and a switching completion position at which the switching processing should be completed, as the scheduled switching point.

4. The moving object travel support apparatus according to claim 1, wherein the travel mode determination unit determines which travel mode is to be selected out of the manual travel mode and the automatic travel mode on the basis of a road condition on a target route.

5. The moving object travel support apparatus according to claim 1, wherein the travel mode determination unit selects the manual travel mode when a condition necessary for selecting the automatic travel mode is not satisfied.

6. The moving object travel support apparatus according to claim 1, further comprising an information providing unit that provides a condition of the predetermined manual travel zone to a driver.

7. The moving object travel support apparatus according to claim 1, wherein the travel control details decision unit evaluates the visual recognition targets on the basis of their impact on traffic safety.

8. The moving object travel support apparatus according to claim 1, wherein the travel control details decision unit decides the travel control details so that the driver can visually recognize a visual recognition target having a large impact on traffic safety out of the visual recognition targets.

9. The moving object travel support apparatus according to claim 3, wherein
the switching completion position is set at an entrance of the predetermined manual travel zone, and
the switching start position is set on the basis of the switching completion position, time required for the switching processing, and an estimated speed of the moving object.

10. The moving object travel support apparatus according to claim 1, wherein the scheduled switching point is set in a region where a speed of the moving object is a predetermined speed or less.

11. The moving object travel support apparatus according to claim 10, wherein the scheduled switching point is set at a point where a stop indicator is installed.

12. The moving object travel support apparatus according to claim 11, wherein the travel control details decision unit estimates a predetermined stop indicator that achieves the speed of the moving object being the predetermined speed or less when the moving object has arrived out of the stop indicators existing within a predetermined range from an entrance of the predetermined manual travel zone, and sets the scheduled switching point at a point where the estimated stop indicator is installed.

13. A moving object travel support method being a method of supporting travel of a moving object, the method comprising:
- determining which travel mode is to be selected out of a manual travel mode and an automatic travel mode;
- deciding a scheduled switching point at which the automatic travel mode is switched to the manual travel mode when the manual travel mode has been selected; and
- deciding travel control details at the time of travel in the automatic travel mode up to the scheduled switching point on the basis of a condition of a predetermined manual travel zone including the scheduled switching point;
- deciding the travel control details by evaluating a visual recognition condition of a driver toward visual recognition targets included in a surrounding environment of the predetermined manual travel zone; and
- giving weights to said visual recognition targets in accordance with their impact on traffic safety.

* * * * *